(12) United States Patent
Imajo

(10) Patent No.: US 8,204,322 B2
(45) Date of Patent: Jun. 19, 2012

(54) IMAGE PROCESSING METHOD, ENCODER, AND DECODER

(75) Inventor: Chikara Imajo, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1109 days.

(21) Appl. No.: 12/068,460

(22) Filed: Feb. 6, 2008

(65) Prior Publication Data

US 2008/0240585 A1 Oct. 2, 2008

(30) Foreign Application Priority Data

Mar. 30, 2007 (JP) ................................. 2007-094335

(51) Int. Cl.
*G06K 9/36* (2006.01)
*G06K 9/46* (2006.01)
*H04B 1/66* (2006.01)

(52) U.S. Cl. ..................... 382/238; 382/239; 375/240.12
(58) Field of Classification Search .................. None
See application file for complete search history.

(56) References Cited

U.S. PATENT DOCUMENTS

| | | | | |
|---|---|---|---|---|
| 6,014,463 | A * | 1/2000 | Hirabayashi | 382/232 |
| 6,674,910 | B1 * | 1/2004 | Moon et al. | 382/239 |
| 7,254,273 | B2 * | 8/2007 | Sakanashi et al. | 382/238 |
| 7,418,146 | B2 * | 8/2008 | Watanabe et al. | 382/247 |
| 2001/0017942 | A1 * | 8/2001 | Kalevo et al. | 382/238 |
| 2004/0028282 | A1 * | 2/2004 | Kato et al. | 382/236 |
| 2006/0120456 | A1 * | 6/2006 | Tasaka et al. | 375/240.16 |

FOREIGN PATENT DOCUMENTS

| | | |
|---|---|---|
| JP | 8-317401 | 11/1996 |
| JP | 2002-77635 | 3/2002 |
| JP | 2006-165699 | 6/2006 |

OTHER PUBLICATIONS

Cohen, A.; Merhav, N.; Weissman, T "Scanning and Sequential Decision Making for Multidimensional Data-Part I: The Noiseless Case". IEEE Transactions on Information Theory, Sep. 2007, vol. 53 Issue:9, pp. 3001-3020.*
Artur Przelaskowski, "Hybrid Lossless Coder of Medical Images with Statistical Data Modelling", SpringerLink, Computer Analysis of Images and Patterns Lecture Notes in Computer Science, 2001, vol. 2124/2001, pp. 92-101.*
Nasir D. Memon, et al. "Lossless Image Compression with a Codebook of Block Scans", IEEE Journal on Selected Areas in Communications, v.13, 1995, pp. 24-30.*
Japanese Office Action issued Mar. 8, 2011 in corresponding Japanese Patent Application 2007-094335.

* cited by examiner

*Primary Examiner* — Li Liu
(74) *Attorney, Agent, or Firm* — Staas & Halsey LLP

(57) ABSTRACT

A method of coding (decoding) an image comprised of a pixel block divided into a plurality of sub-blocks, which method autonomously determines an order of optimal coding (decoding) adapted to a correlation between adjacent sub-blocks without providing additional information. This method pays attention to context information accompanying the image information and instructing a correlation direction between pictures and so on, sequentially predicts a reference sub-block serving the best coding (decoding) efficiency among adjacent reference sub-blocks to be referred to for the coding (decoding) based on the correlation direction, and determining the order of coding (decoding) according to this prediction.

16 Claims, 14 Drawing Sheets

PRESENT INVENTION

▨ : PRESENT PROCESSING REGION

☐ : REFERENCE REGION

↘ : PREDICTION DIRECTION

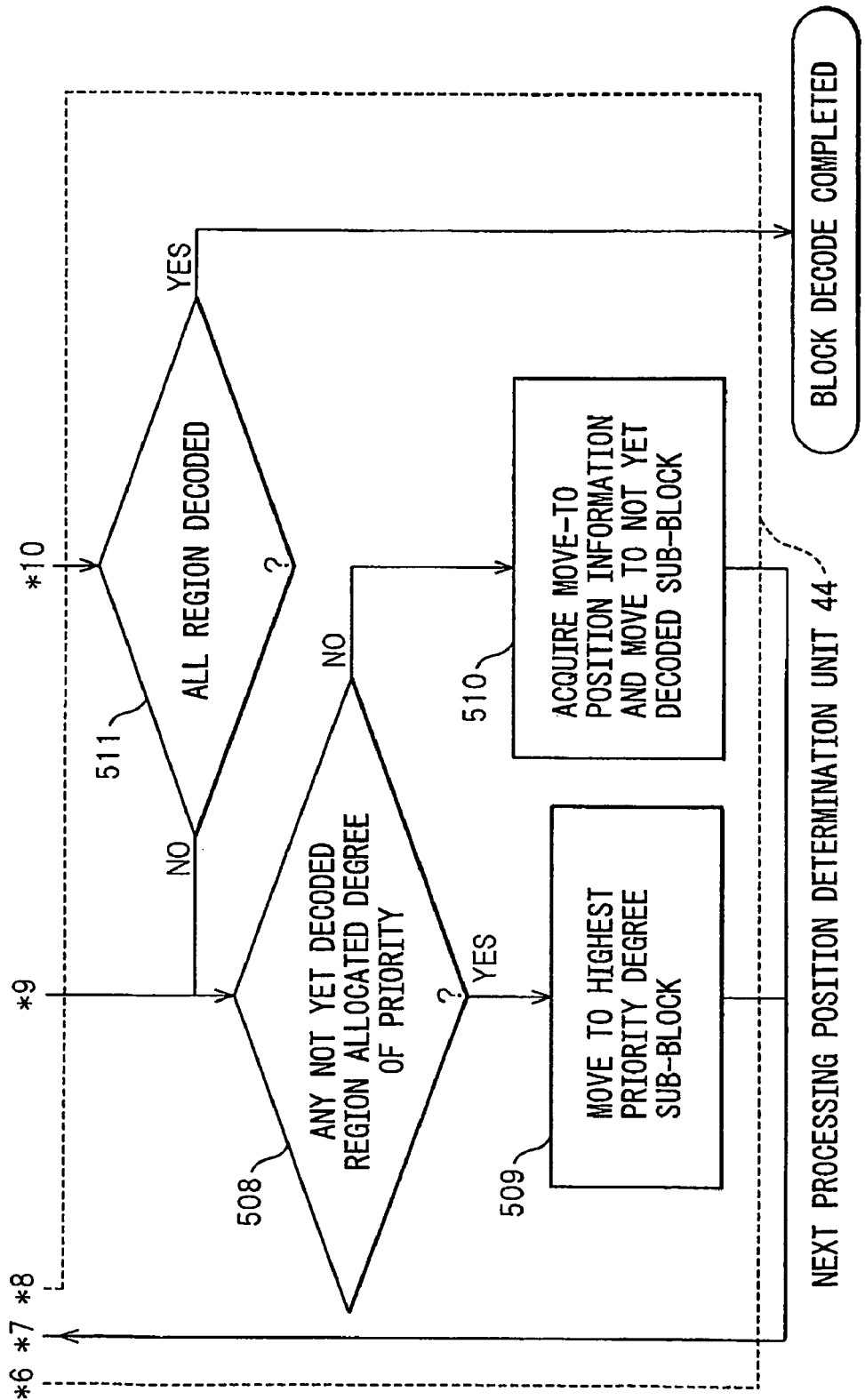

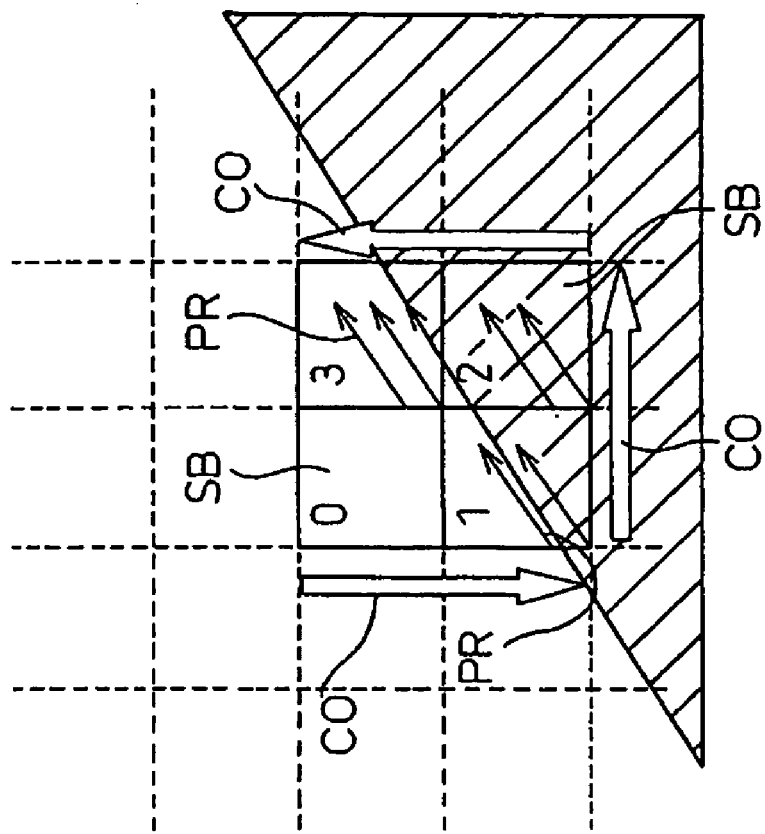
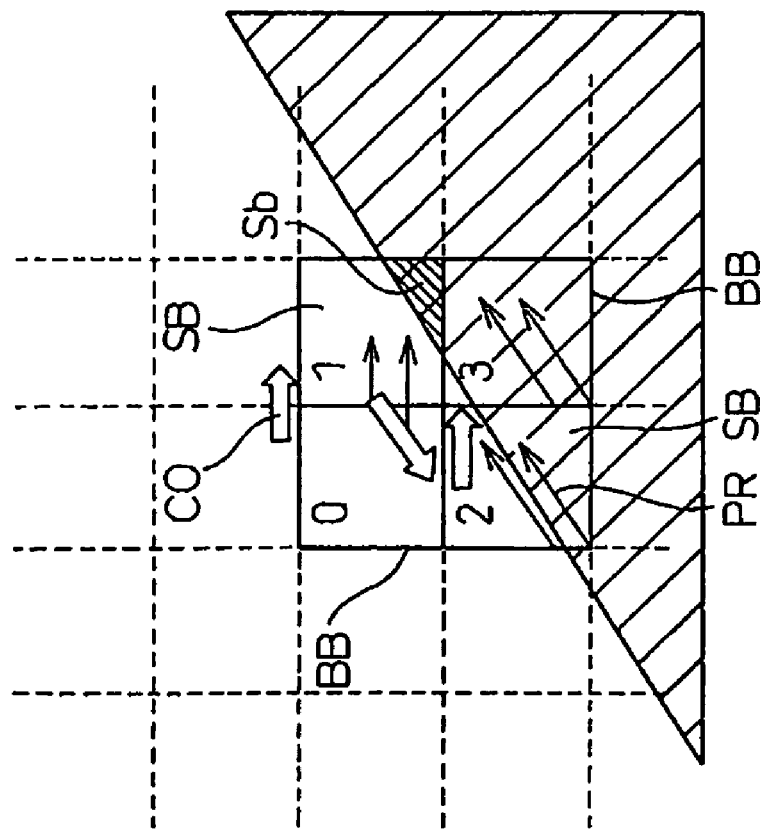
FIG.14A
FIG.14B

IMAGE PROCESSING METHOD, ENCODER, AND DECODER

BACKGROUND ART OF THE INVENTION

1. Field of the Invention

The present invention relates to a method of processing original information of a still image or moving image, more particularly relates to a method of coding that original image information and decoding that coded information. Further, the present invention relates to an encoder and a decoder for carrying out that method.

2. Description of the Related Art

When coding original image information and transmitting it to a reception side, in order to improve the coding efficiency of coding a pixel block to be coded, use is made of the so-called predictive coding method for coding a target pixel block by predicting the target pixel block from peripheral pixel blocks located in its vicinity. A variety of these predictive coding methods have been established as standard methods in the past. As one of these, the ITU-T standard H.264 has been proposed in recent years. If the present invention is applied to for example an image coding method based on this H.264, it would become possible to further raise the coding efficiency, that is, the data compression efficiency.

Note that as known art concerning the present invention, there are Japanese Patent Publication (A) No. 8-317401 and Japanese Patent Publication (A) No. 2002-77635. Japanese Patent Publication (A) No. 8-317401 discloses, when a binary image is divided into several frames, to analyze these divided frames so as to determine the coding method of the nearby frames and thereby improve the coding efficiency. Further, Japanese Patent Publication (A) No. 2002-77635 discloses, when coding a multi-value image, to adaptively change the pixel which is referred to in order to obtain a predictive value of DPCM in accordance with the statuses of the peripheral pixels. However, neither include the concept of the basis of the present invention, that is, "control of the coding order".

FIGS. 14A and 14B are diagrams showing a general coding order (FIG. 14A) and an optimal coding order (FIG. 14B). FIGS. 14A and 14B show portions in the original image where for example a first color (blanks) and a second color (hatchings) obliquely contact. Further, in the figures, the block boundaries (BB) show the boundaries of the pixel blocks now being coded. These pixel blocks are divided into for example four sub-blocks SB.

When sequentially processing these four sub-blocks SB, the coding order thereof, considering the raster scanning of TV signals, generally becomes as indicated by the white arrows Co (coding order) in the figures. Accordingly, the coding order of sub-blocks SB in FIG. 14A becomes "0→1→2→3". However, this raster scanning involves the following problem.

First, in the case of a pattern of the image shown in FIG. 14A, the direction of prediction from the peripheral sub-blocks becomes as indicated by the arrows PR (prediction) in the figure. However, FIG. 14A shows an example of the extrapolative prediction direction (PR) among general inter-polative prediction and extrapolative prediction. This being the case, the following inconvenience arises in a portion sb indicated by the double hatching in FIG. 14A.

When coding this portion sb, the sub-block SB which should be referred to becomes the sub-block SB (3) just beneath that sb, according to the above-described prediction direction. However, this sub-block SB (3) has not yet finished being coded judging from the above coding order CO. That is, such a not yet coded sub-block SB (3) cannot be referred to. This being the case, the problem arises that the related portion sb ends up remaining as a portion unable to be predictively coded.

Therefore, if trying to solve this problem, the optimal coding order such as shown in FIG. 14B may be employed. According to the coding order of FIG. 14B, the problem of the portion sb unable to be predictively coded shown in FIG. 14A is solved. This is because the sub-block SB (2) just beneath of that portion sb finishes being coded earlier.

However, when employing the optimal coding order of FIG. 14B, another problem arises. This is the problem that it is usually difficult to determine the above optimal coding order adaptively and in a short time for each pixel block (block surrounded by BB), so the prediction efficiency of predicting the pixel block drops and as a result the coding efficiency drops.

If trying to determine the optimal coding order of FIG. 14B adaptively and in a short time, it becomes necessary to add additional information for designating the optimal coding order for each pixel block. However, if trying to do this, then another problem is caused of the coding efficiency dropping by the addition of the above additional information.

SUMMARY OF THE INVENTION

Accordingly, in consideration with the above problems, a first object of the present invention is to provide an image processing method able to adaptively change the optimal coding order and decoding order without requiring additional information designating the optimal coding order and decoding order explained above. A second object of the present invention is to provide an encoder and a decoder for this purpose.

To attain the first object, the present invention provides a method of coding (decoding) an image comprised of a pixel block divided into a plurality of sub-blocks, which method autonomously determines an order of optimal coding (decoding) adapted to a correlation between adjacent sub-blocks without providing additional information. This method pays attention to context information accompanying the image information and instructing a correlation direction between pictures and so on, sequentially predicts a reference sub-block serving the best coding (decoding) efficiency among adjacent reference sub-blocks to be referred to for the coding (decoding) based on the correlation direction, and determining the order of coding (decoding) according to this prediction.

BRIEF DESCRIPTION OF THE DRAWINGS

The above objects and features of the present invention will be more apparent from the following description of the preferred embodiments given with reference to the accompanying drawings, wherein:

FIG. 1A is a diagram conceptually representing conventional image processing, while

FIG. 13 is a flow chart representing processing of the decoding order control (second); and FIG. 14A is a diagram showing a general coding order, while FIG. 14B is a diagram showing an optimal coding order.

DESCRIPTION OF THE PREFERRED EMBODIMENTS

Preferred embodiments of the present invention will be described in detail below while referring to the attached figures.

Figure 1A:
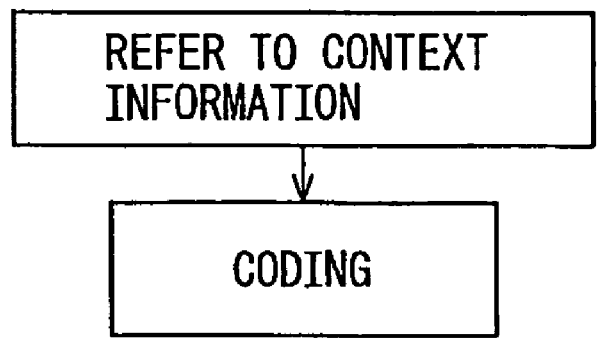
Figure 1B:
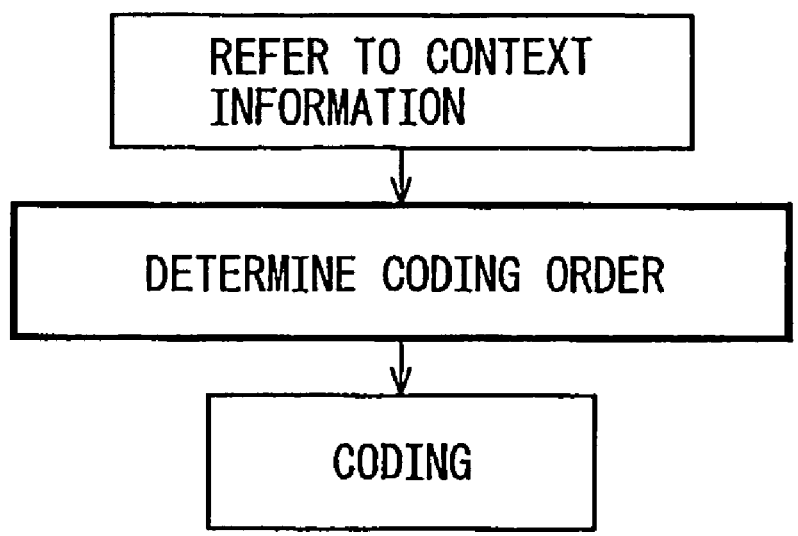
FIG. 1B is a diagram conceptually representing the image processing of the present invention.

FIG. 1A is a diagram conceptually representing conventional image processing, while FIG. 1B is a diagram conceptually representing the image processing of the present invention. Referring to FIG. 1A first, in for example image processing based on the standard H.264 explained before, the context information is generated, and the coding (decoding) is carried out according to this context information.

Contrary to this, under the present invention of FIG. 1B, the aforesaid optimal coding (decoding) order is determined with reference to the generated context information, and the coding (decoding) is carried out according to the order by this determination.

Namely, a direction having correlation in a picture is acquired from the context information. The acquired correlation direction is utilized to achieve improvement of the data compression efficiency and determine the optimal coding (decoding) order.

Namely, by reading a correlation direction in a picture or between pictures, included in the context information, and then utilizing this correlation direction as the prediction information, the optimal coding (decoding) order as shown in for example FIG. 14B is determined while adaptively changing this order.

Thus, in contrast to the need for additional information for designating the processing order of sub-blocks one after another when trying to determine the above optimal coding (decoding) order as in the past, according to the present invention, both of the encoder and decoder can autonomously determine, in the same way, the coding (decoding) order depending upon the prediction information read from the context information, therefore the above additional information can be made unnecessary.

In this case, if determining the processing order from the above prediction information according to a rule determined in advance, both of the encoder and decoder can autonomously determine the same processing order of coding/decoding. Note, here, that there may be a possibility that the processing order cannot be conclusively determined depending on the pixel pattern. In such a case, the order information, determined at the encoder, can be directly transmitted to the decoder as well.

An image processing method (or program) according to one aspect of the present invention is an image processing method where each of the pixel blocks (in block boundaries BB) composing a picture is divided into a plurality of sub-blocks SB and coding these plurality of sub-blocks are coded in sequence while referring to context information indicating at least a prediction direction in a picture or between pictures, which method basically has a reading step of reading the prediction direction from the context information and a coding step of coding the sub-block while adaptively changing a coding order of the plurality of sub-blocks to be sequentially encoded based on that read prediction direction.

More specifically, after the above reading step, it has a head setting step of setting a head sub-block for starting the coding in the pixel block and a priority degree allocating step of allocating a higher degree of priority in an order from a sub-block which must finish the coding earliest based on the prediction direction in the context information for one or more reference sub-blocks not yet encoded which adjoin the head sub-block and referred to for the coding of the head sub-block, and the coding step is sequentially executed from the reference sub-block to which the highest degree of priority is allocated.

More specifically, when a not yet encoded sub-block still remains in the pixel block even after completion of the coding of the reference sub-block to which the lowest degree of priority was allocated, the above-mentioned head setting step, priority degree allocating step, and coding step are repeated.

Further, the method can have a transmission step transmitting designation information designating the head sub-block in the aforesaid head setting step to the decoder side, included in the context information or as additional information.

Further, the aforesaid priority degree allocating step is preferably executed only when the reference sub-block is a not yet encoded sub-block; and, when the coding of the reference sub-block has been already completed, this reference sub-block is referred to and the coding step is instantaneously executed or, when all adjacent sub-blocks of the present sub-block to be coded are end sub-blocks of the picture or not yet encoded sub-blocks having lower degrees of priority, the present sub-block to be coded is instantaneously encoded.

Note that, when executing the coding step explained above, if a sub-block having a low degree of priority is going to refer to a sub-block having a higher degree of priority than that, prohibition step of prohibiting the reference may be included.

The above description was an explanation for the coding method in the image processing method of the present invention. Below, an explanation will be given to the decoding method in the image processing method. Note, as explained before, both of the encoder and decoder of the present invention autonomously perform the coding processing and decoding processing under the same rule with reference to the same context information, therefore the decoding method of the present invention is almost the same as the coding method explained above.

Namely, the image processing method (or program) on the decoding side of the present invention is an image processing method where each of the pixel blocks (in block boundaries) composing a picture is divided into a plurality of sub-blocks and decoding these plurality of sub-blocks are decoded in sequence while referring to context information indicating at least a prediction direction in a picture or between pictures, which method basically has a reading step of reading the prediction direction from the context information and a decoding step of decoding the sub-block while adaptively changing the decoding order of the plurality of sub-blocks to be sequentially decoded based on that read prediction direction.

More specifically, after the above reading step, it has a head setting step of setting a head sub-block for starting the decoding in the pixel block and a priority degree allocating step of allocating a higher degree of priority in an order from a sub-block which must finish the decoding earliest based on the prediction direction in the context information for one or more not yet decoded reference sub-blocks adjacent to the head sub-block and referred to for the decoding of the head sub-block, and the decoding step is sequentially executed from the reference sub-block to which the highest degree of priority is allocated.

More specifically when a not yet decoded sub-block still remains in the pixel block even after completion of the decoding of the reference sub-block to which the lowest degree of priority was allocated, the above-mentioned head setting step, priority degree allocating step, and decoding step are repeated.

Further, the method can have a reception step of receiving designation information designating the head sub-block in the aforesaid head setting step from the encoder side, included in the context information or as additional information of the context information.

Further, the aforesaid priority degree allocating step is preferably executed only when the reference sub-block is a not yet decoded sub-block; and, when the decoding of the reference sub-block has been already completed, this reference sub-block is referred to and the decoding step is instantaneously executed or, when all adjacent sub-blocks of the present sub-block to be decoded are end sub-blocks of the picture or not yet decoded sub-blocks having lower degrees of priority, the present sub-block to be decoded is instantaneously decoded.

Note that when executing the decoding step explained before, if a sub-block having a low degree of priority is going to refer to a sub-block having a higher degree of priority than that, a prohibition step of prohibiting the reference may be included.

Next, examples of the configurations of the encoder and decoder for executing the image processing methods on the coding side and decoding side explained above will be explained.

Figure 2:
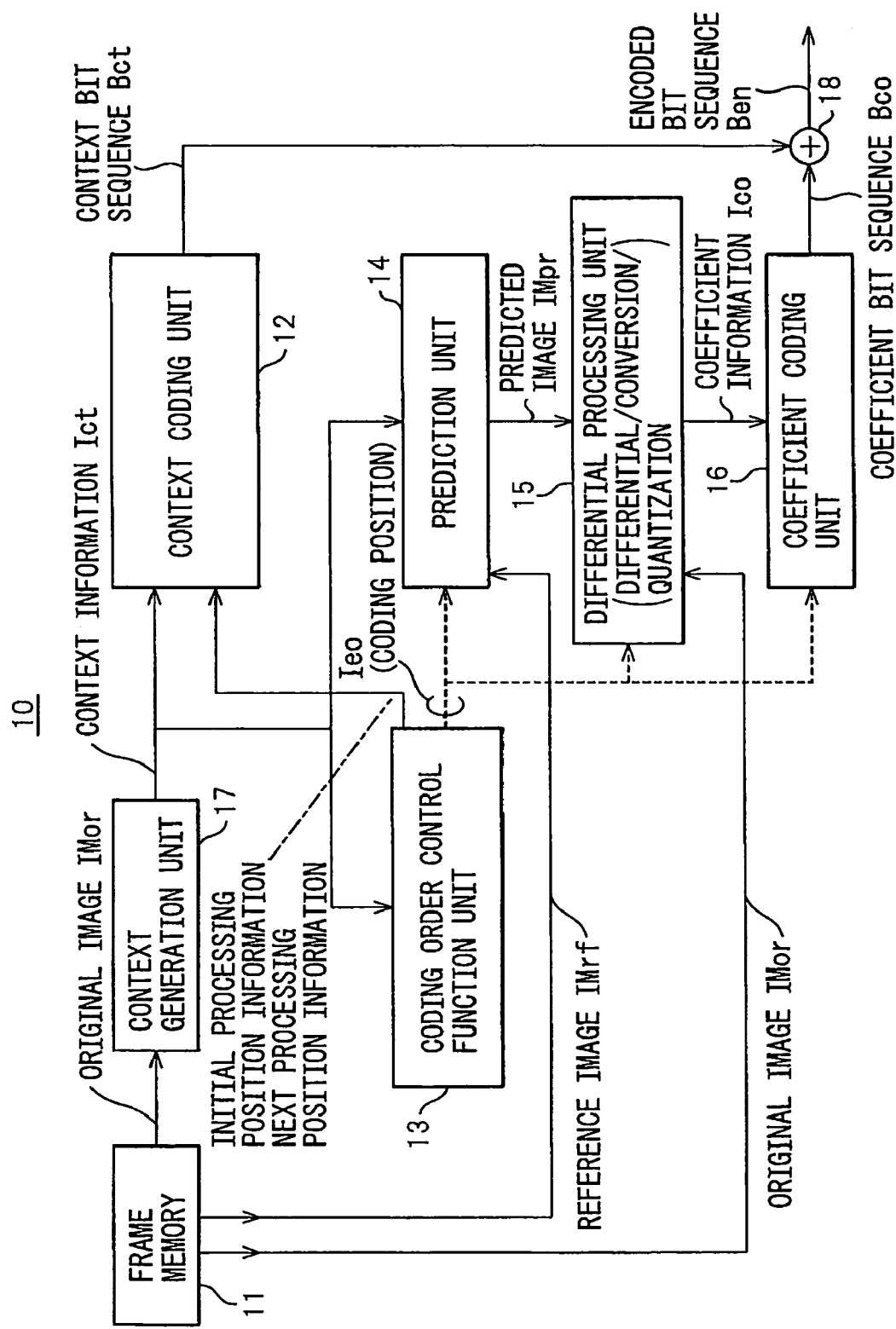
FIG. 2 is a diagram showing an embodiment of an encoder according to the present invention.
Figure 3:
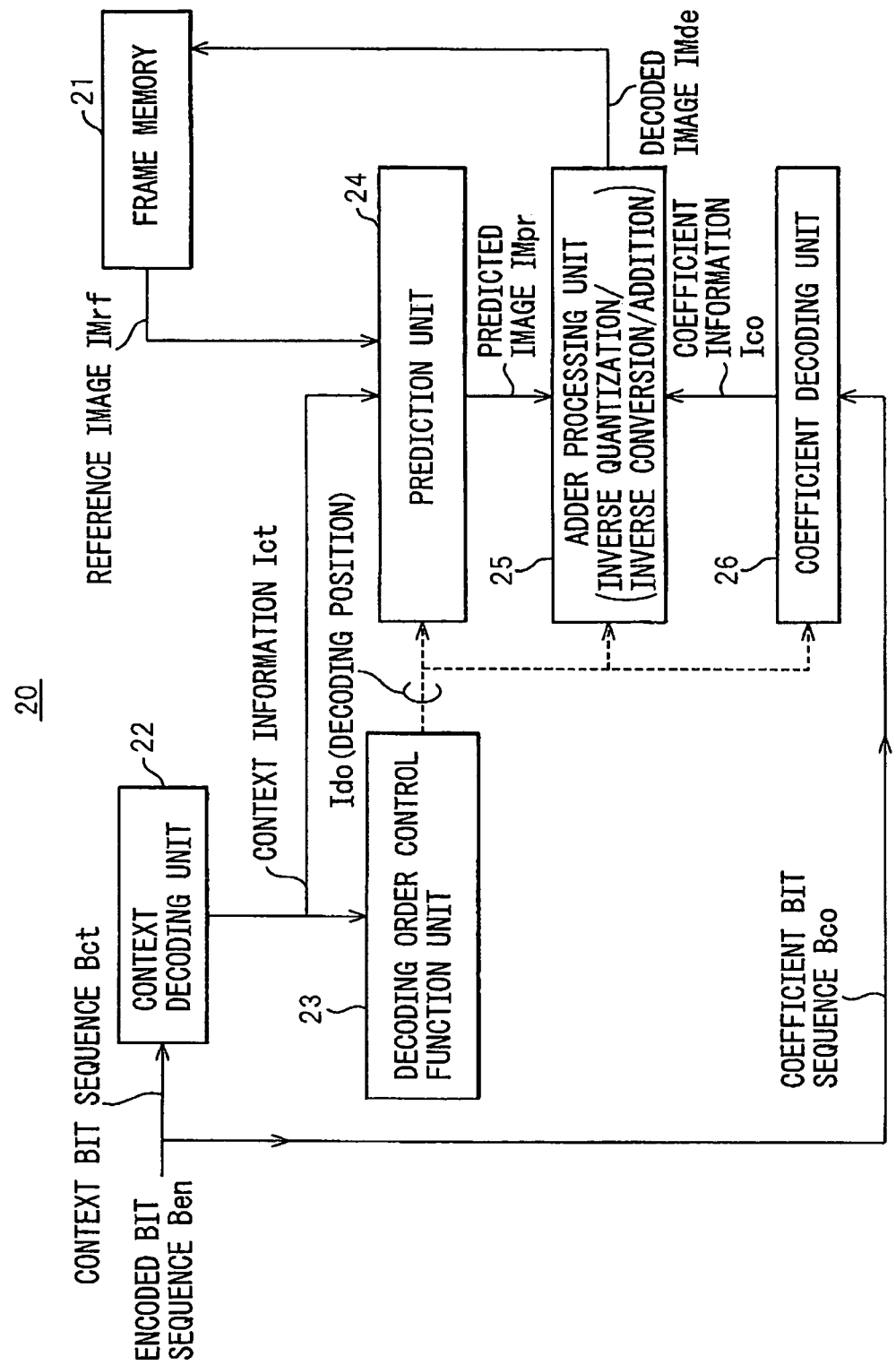
FIG. 3 is a diagram showing an embodiment of a decoder according to the present invention.

FIG. 2 is a diagram showing an embodiment of the encoder according to the present invention, while FIG. 3 is a diagram showing an embodiment of the decoder according to the present invention. The configuration of the encoder 10 will be explained first with reference to FIG. 2. In the embodiment of the present figure, the coding of a still image or moving image performed by dividing a picture into any units of pixel blocks (in BB) and further dividing each pixel block into sub-blocks SB is carried out. This coding processing is carried out, as shown in FIG. 2, by means of: a frame memory 11 for storing one target picture as a whole or storing 0 to a plurality of pictures at different times; a context generation unit 17; a context coding unit 12; a coding order control unit 13; a prediction unit 14; a differential processing unit (difference/conversion/quantization unit) 15; and a coefficient coding unit 16.

In the encoder 10 of the present figure, the coding order control unit 13 performs call control (order control) in the processings of the prediction unit 14, differential processing unit (difference/conversion/quantization unit) 15, and coefficient coding unit 16, based on context information Ict (context) generated by the context generation unit 17.

The prediction unit 24 prepares, based on a coding position instructed by the coding order control unit 23, the instructed reference image, and the context information Ict, a predicted image IMpr (prediction) at the instructed position. The differential processing unit (difference/conversion/quantization unit) 15 generates a difference between the predicted image IMpr and the original image IMor (original) and further applies conversion, for example, frequency conversion, quantization, or other processing, to generate coefficient information Ico (coefficient). This coefficient information Ico is transformed to a coefficient bit sequence Bco by the coefficient coding unit 16. Further, the context information Ict is transformed to a context bit sequence Bct as well by the context coding unit 12 and superimposed on the coefficient bit sequence Bco in a predetermined order by an adder means 18, whereby an encoded bit sequence Ben (encode) is generated. Here, the context information Ict explained above includes information of from which nearby pixel (sub-block) in the picture the interpolative prediction or extrapolative prediction is to be carried out and information instructing which of the portions in the picture differing in time is to be referred to so as to perform the prediction.

Summarizing the above, the encoder according to the embodiment is an encoder 10 provided with a context generation unit 17 for generating context information Ict of each sub-block from an original image IMor stored in the memory 11 and comprised of a plurality of sub-blocks SB before coding, a context coding unit 12 for coding the context information Ict and outputting the context bit sequence Bct, a prediction unit 14 for generating a predicted image IMpr with reference to the context information based on a reference image IMrf stored in the memory 11 and comprised of a sub-block after coding, a differential processing unit 15 for generating predetermined coefficient information Ico based on the difference between the original image IMor and the predicted image IMpr, and a coefficient coding unit 16 for coding the coefficient information Ico and outputting the coefficient bit sequence Bco; which encoder 10 transmits the encoded bit sequence Ben formed by adding the context bit sequence Bct and the coefficient bit sequence Bco at the adder means 18 to the decoder (20) side. This has the following characteristic features.

Namely, this is characterized in that provision is further made of a coding order control function unit 13 for receiving as input the context information Ict, determining the coding order of a plurality of sub-blocks SB based on the prediction direction in a picture or between pictures of the original image IMor included in this context information, and outputting the same as coding order information Ieo (encode order), and the above prediction unit 14, differential processing unit 15, and coefficient coding unit 16 respectively set processing orders of sub-blocks to be processed by them according to the coding order information Ieo from the coding order control function unit 13.

Referring to FIG. 3 next, the decoder 20 according to the embodiment is shown. In this decoder 20 as well, in the same way as the encoder, the decoding order control function unit 23 performs the decoding order control with respect to the prediction unit 24, adder processing unit (inverse quantization/inverse conversion/adder unit) 25, and the coefficient decoding unit 26, based on the context information (Bct) extracted from the encoded bit sequence Ben transmitted from the encoder 10 of FIG. 2.

Namely, the decoder 20 according to the embodiment is a decoder 20 provided with a context decoding unit 22 for receiving as input the context bit sequence Bct included in the encoded bit sequence Ben from the encoder 10, decoding this, and outputting the context information Ict; a prediction unit 24 for generating the predicted image IMpr with reference to the context information Ict, based on the reference image IMrf stored in the memory 21 and comprised by a sub-block after decoding and outputting the same; a coefficient decoding unit 26 for receiving as input the coefficient bit sequence Bco included in the encoded bit sequence Ben from the encoder 10, decoding this, and outputting the coefficient information Ico; and an adder processing unit 25 for generating a decoded image IMde (decode) from both the predicted image from the prediction unit 24 and the coefficient information from the coefficient decoding unit 26 and storing this in the memory 21. This has the following characteristic features.

Namely, this is characterized in that provision is further made of a decoding order control function unit 23 for receiving as input the context information Ict, determining the decoding order of a plurality of sub-blocks SB based on the prediction direction in a picture or between pictures of the original image IMor, which prediction direction is included in this context information, and outputting this as decoding order information Ido (decode order), and the prediction unit 24, adder processing unit 25, and coefficient decoding unit 26 respectively set processing orders of sub-blocks to be individually processed according to the decoding order information Ido from the decoding order control function unit 23.

Figure 4:
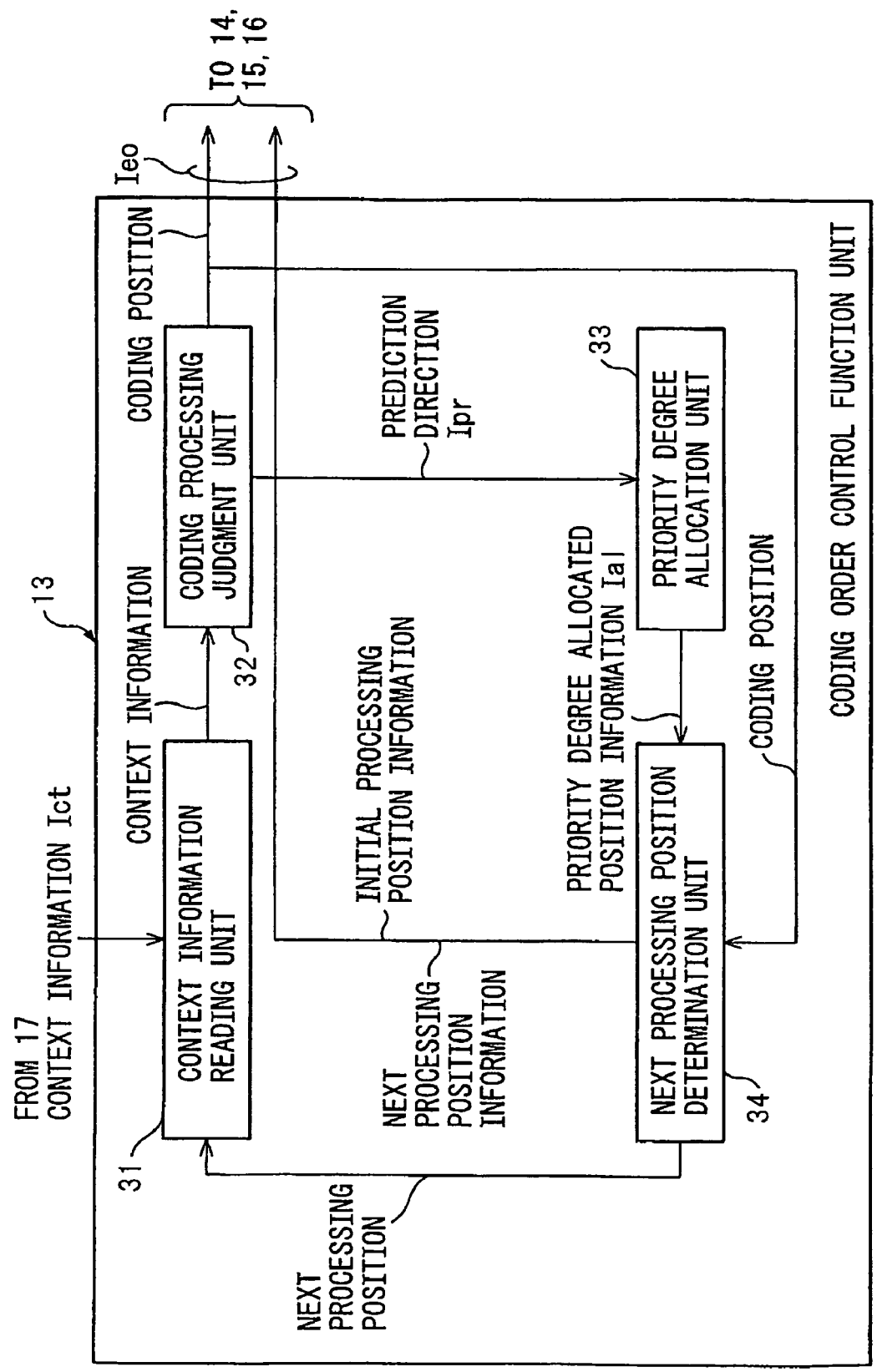
FIG. 4 is a diagram showing a concrete example of a coding order control function unit 13.
Figure 5:
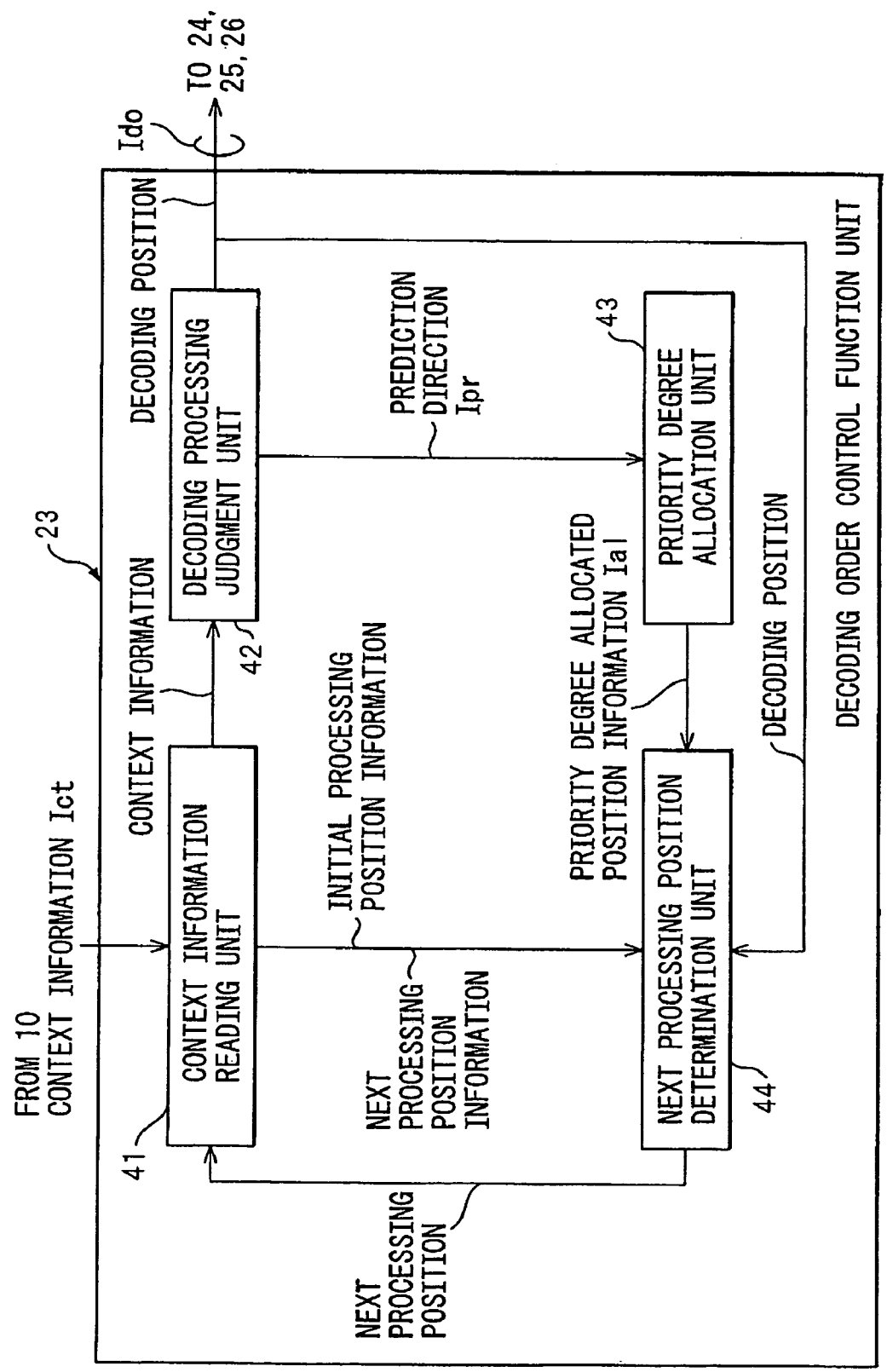
FIG. 5 is a diagram showing a concrete example of a decoding order control function unit 23.

Next, the units (13, 23) particularly representing the present invention among the components shown in FIG. 2 and FIG. 3 described above will be further concretely shown. FIG. 4 is a diagram showing a concrete example of the coding order control function unit 12, while FIG. 5 is a diagram showing a concrete example of the decoding order control function unit 23. First, the coding order control function unit 13 will be explained with reference to FIG. 4.

The coding order control function unit 13 includes a context information reading unit 31, coding processing judgment unit 32, priority degree allocation unit 33, and next processing position determination unit 34.

First, the context information reading unit 31 reads the context information Ict of the target sub-block SB for coding and transfers this to the coding processing judgment unit 32. This coding processing judgment unit 32 judges whether or not that sub-block is to be encoded from the above context information Ict or the coding status around the sub-block. When it is judged that the coding cannot be immediately carried out, in-picture prediction direction information Ipr obtained from the above context information is transferred to the priority degree allocation unit 33. On the other hand, when it is judged that the coding can be immediately carried out, the processing for coding is instructed to the units (14, 15, 16) by informing the coding position of the present sub-block to the units (14, 15, 16) in the encoder 10. Further, the coding position of the present sub-block is informed to the next processing position determination unit 34.

The priority degree allocation unit 33 receiving as input the above prediction direction information Ipr allocates degrees of priority to not yet encoded periphery sub-blocks by considering the coding situation surrounding that sub-block as well.

The next processing position determination unit 34 receiving as input the above coding position and above allocated degrees of priority moves the processing to the sub-block having the highest degree of priority based on the encoded/not yet encoded state and the allocated degrees of priority thereof. At this time, if the degrees of priority are not allocated, it is determined to which not yet encoded sub-block the processing is to be moved, and this is output to the context information reading unit 31 in order to superimpose the move-to position information on the context information Ict.

As described above, the coding order control function unit 13 according to the present embodiment is configured by a context reading unit 31 for reading the context information Ict; a coding processing judgment unit 32 for judging whether or not instantaneous coding of the present coding target sub-block is possible with reference to at least the context information Ict, outputting the coding position information thereof as the coding order information Ieo when it is possible, and outputting the prediction information Ipr representing the prediction direction, included in the context information Ict, when it is not possible; a priority degree allocation unit 33 for receiving as input at least the prediction information Ipr, allocating a higher degree of priority in an order from the sub-block for which the coding must be completed earliest with respect to reference blocks comprised of not yet encoded sub-blocks adjacent to the present target sub-block for coding and referred to for the coding of the present target sub-block for coding, and outputting the allocated position as allocated position information Ial (allocate); and a processing position determination unit 34 for receiving as input at least the allocated position information Ial and the coding position information, outputting a next coding processing position information or initial coding processing position information as the coding order information Ieo, and feeding back the next processing position information to the context reading unit 31.

Next, the decoding order control function unit 23 will be explained with reference to FIG. 5.

The decoding order control function unit 23 includes a context information reading unit 41, decoding processing judgment unit 42, priority degree allocation unit 43, and next processing position determination unit 44.

First, the context information reading unit 41 reads the context information Ict of the target sub-block SB for decoding and transfers this to the decoding processing judgment unit 42. This decoding processing judgment unit 42 judges whether or not that sub-block is to be decoded based on the above context information Ict or the decoding status around that sub-block. When it is judged that the decoding cannot be immediately carried out, the in-picture prediction direction information Ipr obtained from the above context information is transferred to the priority degree allocation unit 43. On the other hand, when it is judged that the decoding can be immediately carried out, the units (24, 25, 26) in the decoder 20 are notified of the decoding position of the present sub-block to instruct the processing for decoding. Further, the decoding position of the present sub-block is informed to the next processing position determination unit 44.

The priority degree allocation unit 43 receiving as input the above prediction direction information Ipr allocates degrees of priority with respect to not yet decoded surrounding sub-blocks by considering the decoding situation around of that sub-block as well.

The next processing position determination unit 44 receiving as input the above decoding position and above allocated priority degrees moves the processing to the sub-block having the highest degree of priority based on the decoded/not yet decoded state and the allocated degrees of priority thereof. At this time, when the degrees of priority are not allocated, which not yet decoded sub-block the processing is to be moved is determined with reference to the context information Ict or determined according to a rule determined in advance by both of the encoder 10 and decoder 20.

As described above, the decoding order control function unit 23 according to the present embodiment is configured by a context reading unit 41 for reading the context information; a decoding processing judgment unit 42 for judging whether or not instantaneous decoding of the present target sub-block for decoding is possible with reference to at least the context information Ict, outputting the decoding position information thereof as the decoding order information Ido when it is possible, while outputting the prediction information Ipr representing the prediction direction, included in the context information Ict, when it is not possible; a priority degree allocation unit 43 for receiving as input at least the prediction information Ipr, allocating a higher degree of priority in an order from the sub-block for which the decoding must be completed earliest with respect to reference blocks comprised of not yet decoded sub-blocks adjacent to the present decoding target sub-block and referred to for the decoding of the present target sub-block for decoding, and outputting the allocated position thereof as the allocated position information Ial; and a processing position determination unit 44 for receiving as input at least the allocated position information Ial and the decoding position information and feeding back a next decoding processing position information or initial decoding processing position information to the context reading unit 41.

An order control algorithm will be concretely explained for the coding order control function unit 13 (FIG. 4) and decoding order control function unit 23 (FIG. 5) explained above with reference to FIG. 6 to FIG. 13. Note that in the present invention, both of the coding side and decoding side basically follow a common algorithm. Therefore, when they overlap, the explanation will be given for only the coding side.

Figure 6:
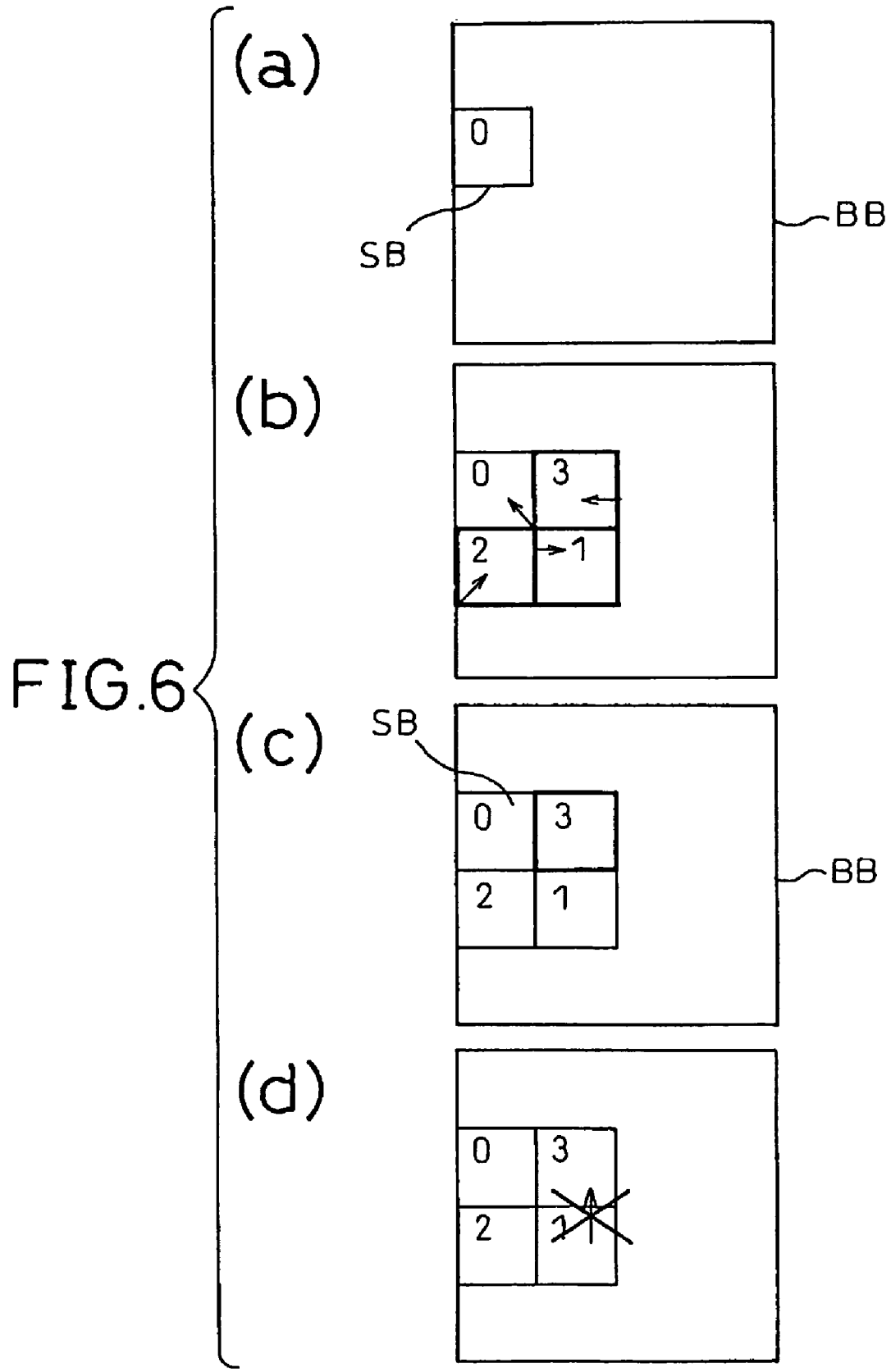
FIG. 6 is a diagram showing a control algorithm of the coding order control function unit 13 (first)
Figure 7:
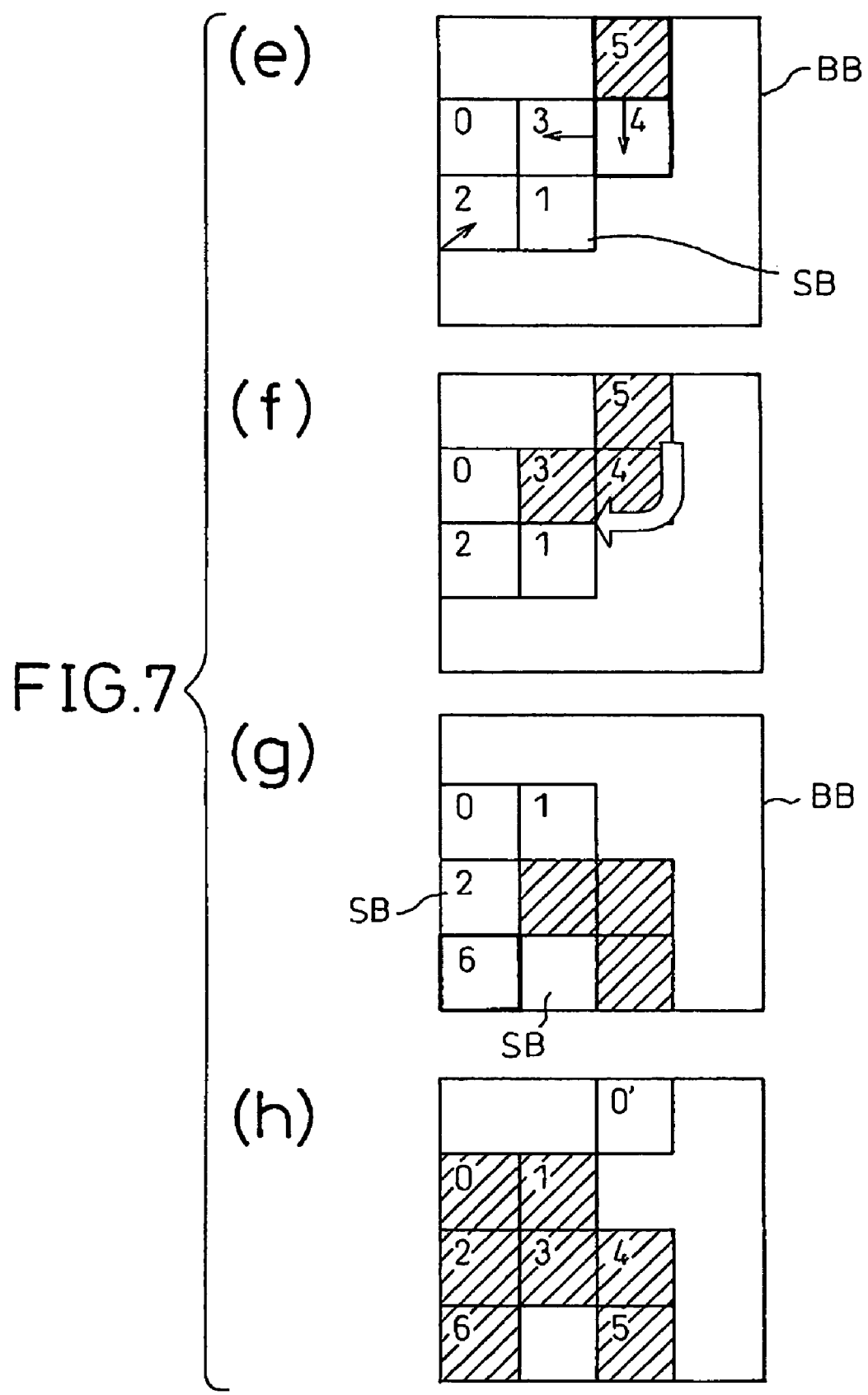
FIG. 7 is a diagram showing the control algorithm of the coding order control function unit 13 (second)
Figure 8:
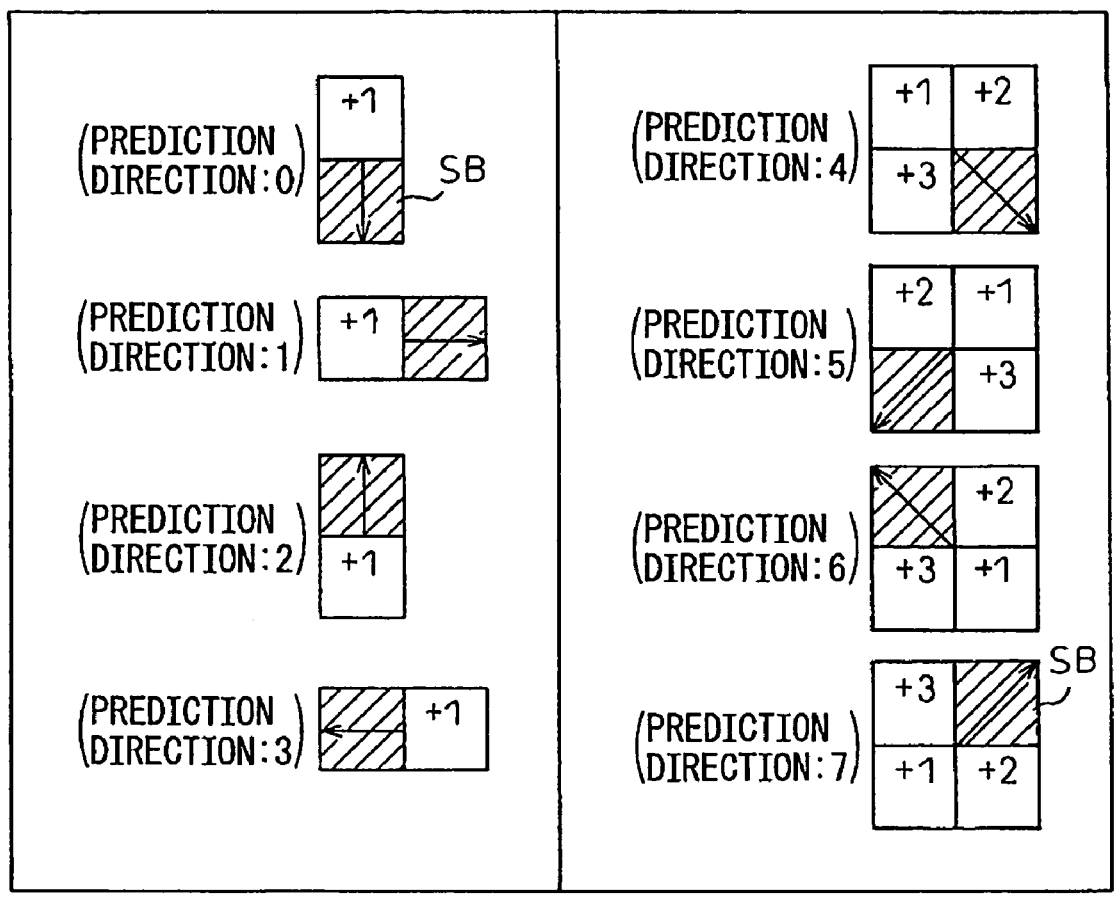
FIG. 8 is a diagram showing a rule (one example) between a prediction direction and an allocation of degree of priority.
Figure 9:
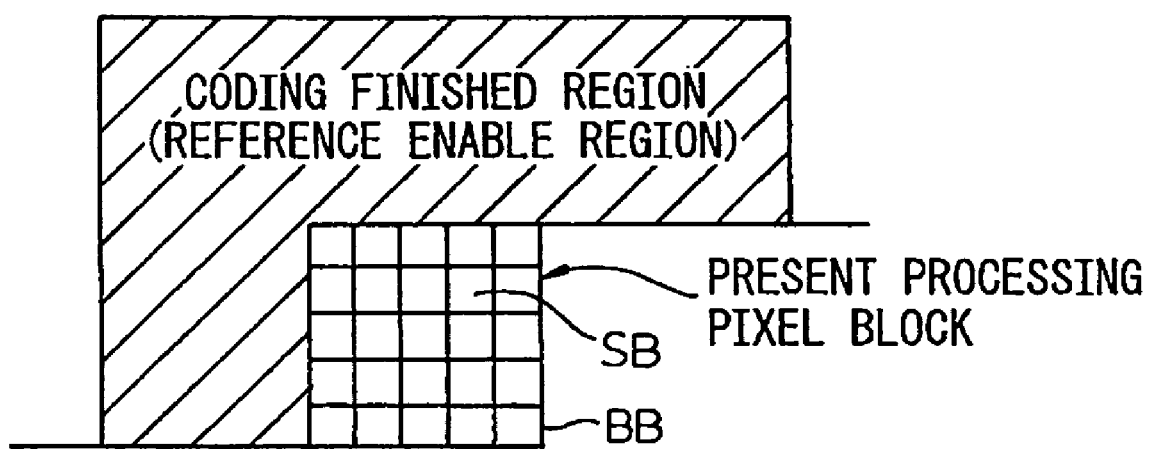
FIG. 9 is a diagram showing an example of a surrounding state of a pixel block.
Figure 10:
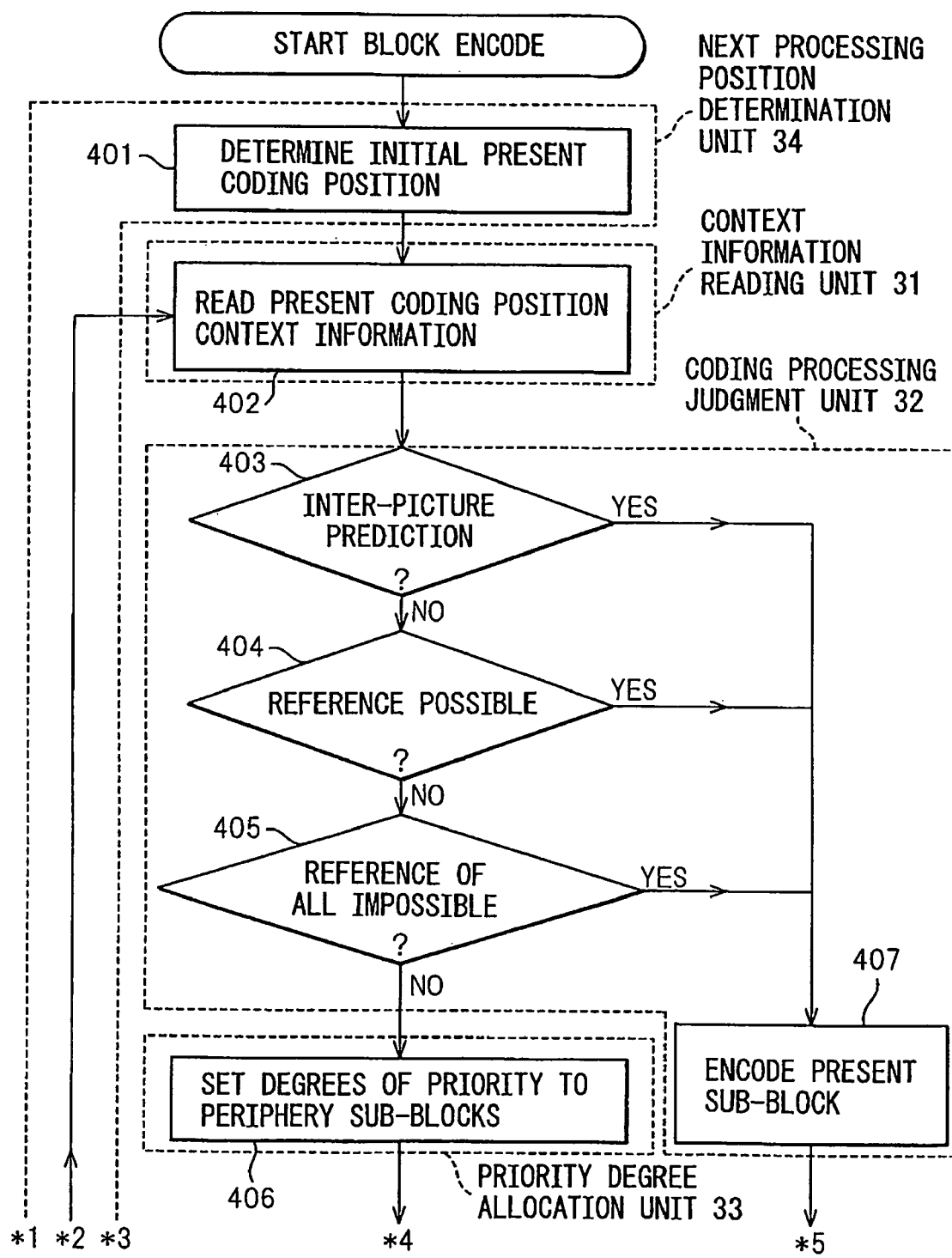
FIG. 10 is a flow chart representing processing of the coding order control (first)
Figure 11:
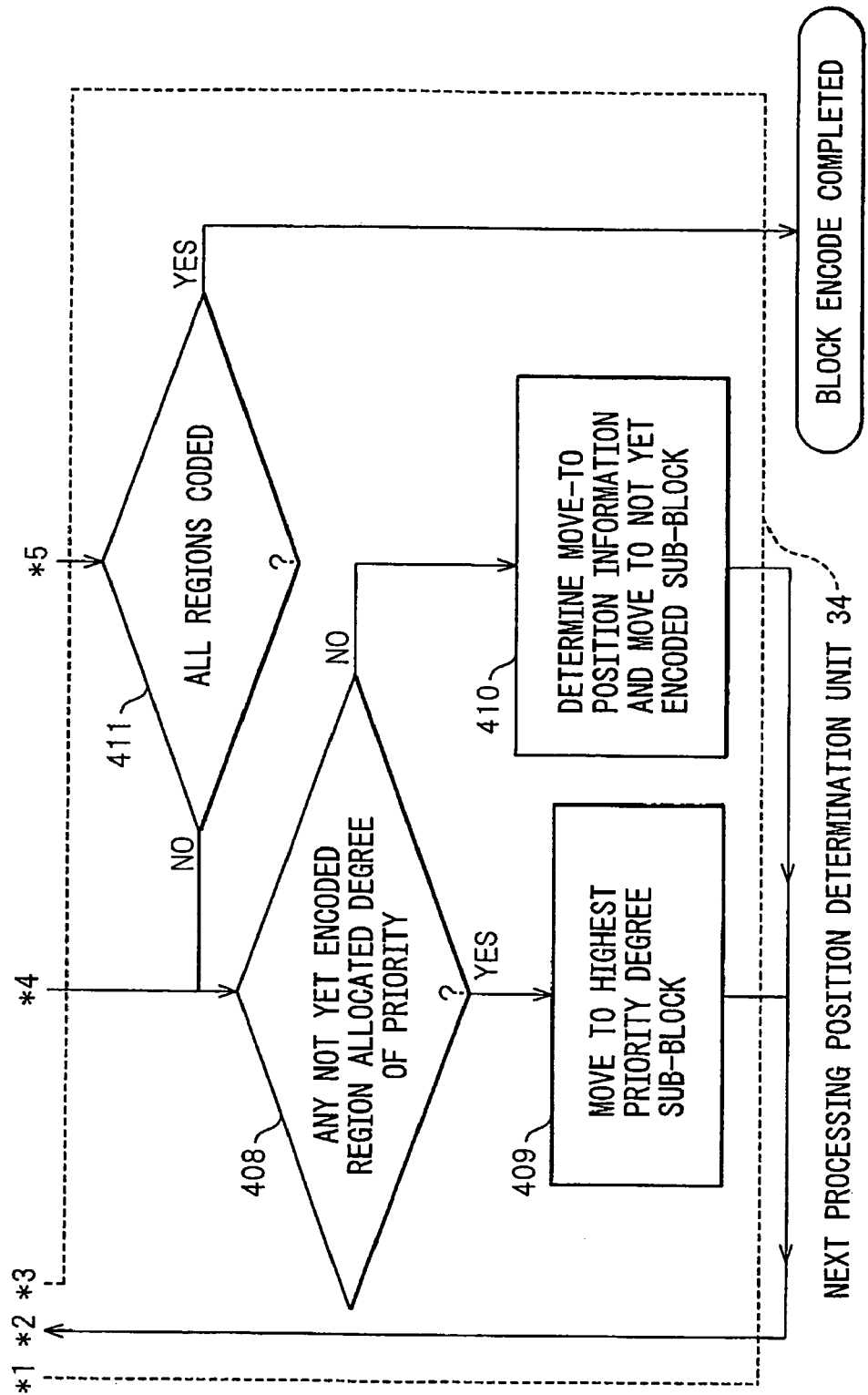
FIG. 11 is a flow chart representing processing of the coding order control (second)
Figure 12:
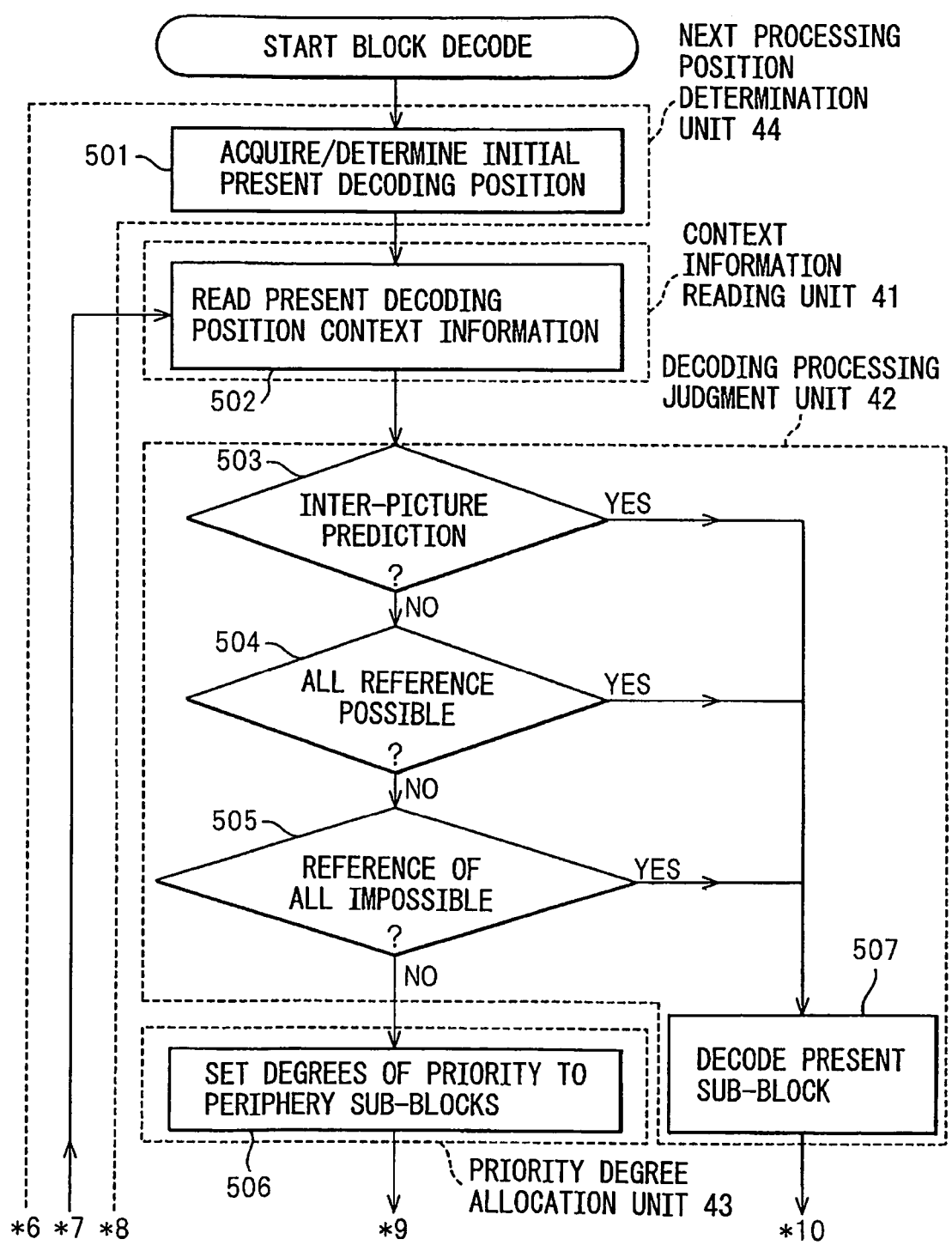
FIG. 12 is a flow chart representing processing of the decoding order control (first)

FIG. 6 is a first part of a diagram showing a control algorithm of the coding order control function unit 13; FIG. 7 is a second part of that diagram; FIG. 8 is a diagram showing a rule (one example) between a prediction direction and an allocation of degree of priority; FIG. 9 is a diagram showing an example of a peripheral state of a pixel block; FIG. 10 is a first part of a flow chart representing processing of the coding order control; FIG. 11 is a second part of a flow chart; FIG. 12 is a first part of a flow chart representing processing of the decoding order control; and FIG. 13 is a second part of the flow chart.

First, referring to FIG. 6 and FIG. 7, BB indicates the boundary of one pixel block as the coding target, while SB indicates one sub-block composing that pixel block. When explaining only the principal points first, they are as follows.

In (a) of FIG. 6, SB indicates the present coding region (sub-block), (b) shows a stage where the region (sub-block) given "0" allocates degrees of priority to peripheral reference regions (sub-blocks) to which the region "0" should referred to, where the larger the numbers (1, 2, . . . ), the higher the degrees of priority allocated, (c) shows that the processing is moved to the region (3) having a high degree of priority, and (d) shows that prohibition of the movement of the processing from the region (1) having a low degree of priority to the region (3) having a high degree of priority ("1" referring to "3") must be prohibited.

Referring to FIG. 7, (e) shows that when only the reference region (5) has already finished being coded (5) or when the present region is an immediately codable region, the function unit 13 instructes the coding of this region to each of the units (14, 15, and 16), (f) shows that the coding is executed in an order from the sub-block having the highest degree of priority (5→4→3), (g) shows that reallocation of the degrees of priority (6) if the region referring to the not yet encoded region is the present coding region, and (h) shows that the processing is moved to any region (0') not yet coded if all of the regions to which degrees of priority are allocated have finished being coding.

As a prerequisite of the above algorithm, both of the encoder 10 and decoder 20 need the same rule (settlement) concerning the direction of a region to be referred to and the allocation of the degree of priority. As an example of that, it is assumed that the settlement of FIG. 8 is provided. In addition, it is assumed that the information of whether or not the pixel block out of this block boundary is a region which has already been encoded can be obtained as well for the peripheries of the boundary BB of the block which are going to be encoded at present. When the image out of the boundary of the block has been already encoded, it is handled in the same way as the coded region in the pixel block. In this example, as shown in FIG. 9, it is assumed that the coded region has been determined. Note that FIG. 8 described above will be supplementally explained as follows.

In FIG. 8, the prediction direction 0 to prediction direction 7 are specified according to the above prediction information Ipr (FIG. 4). For example, when the prediction direction 0 is specified for the region (SB) at the top left end in the present figure, 1 is added (+1) for the degree of priority of the region just above that SB. That is, when coding that SB, SB (+1) just above the SB is referred to first. In the same way as this, the prediction direction 7 is specified for the region (SB) at the bottom right end in the present figure, and therefore, a settlement (rule) is prepared in advance to add degree of priority in order from the first SB just left to this SB, the second SB just beneath of this SB, and the third SB obliquely under this SB and give +3, +2, and +1, and both of the encoder 10 and decoder 20 perform order control according to this settlement.

Further, the flows of processing of the coding order control (FIG. 10, FIG. 11) and decoding order control (FIG. 12, FIG. 13) will be explained with reference to FIG. 4, FIG. 5, FIG. 6, FIG. 7, FIG. 8, etc. Note that the processing steps concerning FIG. 4 (coding side) are represented as 401, 402, . . . , while the processing steps concerning FIG. 5 (decoding side) are represented as 501, 502, . . . .

Referring to FIG. 10 and FIG. 11 first, the steps to be processed by the units (31, 32, 33, 34) of FIG. 4 are segmented as shown by the dotted line boxes 31, 32, 33, and 34.

At step 401, as shown in FIG. 6(a), a processing start position in the sub-block SB is determined, and the processing start position is set at the predetermined start position.

At step 402, the context information Ict of the present sub-block is confirmed. According to this context information, the judgments at step 403 and step 404 and the processing of step 405 are carried out.

At step 406, when any of the conditions of steps 403, 404, and 405 described above is not met (NO), as shown in FIG. 6(b), degrees of priority are allocated to each sub-block according to the settlement relating to both of the prediction direction and priority degree allocation shown in FIG. 8.

At step 408, it is judged if there is a region to which the degree of priority has been allocated. When there is a region to which the degree of priority has been allocated, the routine advances to step 409 (FIG. 6(c)). If there is no region to which the degree of priority has been allocated, the routine advances to step 410 explained later.

At step 409, as shown in FIG. 7(g), when there is a region to which the priority degree has been allocated, the routine advances to a not yet encoded region having a high degree of priority, and at step 410, when there is no region to which the priority degree has been allocated, the sub-block for which the coding is to be carried out next is determined, and the processing is shifted to the not yet encoded sub-block (FIG. 7(h)).

Note that, at step 403, it is judged if there is a region in the peripheries which can be referred to for inter-picture prediction. When there is no region which can be referred to, the routine advances to step 407 so as to immediately code the present sub-block. At this step 403, the context information Ict is referred to. If the present sub-block uses the inter-picture prediction, the routine advances to step 407 in order to immediately code the present sub-block.

At step 404, if none of sub-blocks in the peripheries referred to by the present encoded sub-block is a region which can be referred to (FIG. 7(e)), the routine advances to step 407 in order to immediately code the present sub-block. At step 407, the coding of the present sub-block is instructed to the units (14, 15, and 16).

At step 411, following the result of step 407, when the coding of all sub-blocks belonging to the present pixel block is completed, the coding of the present pixel block is completed. When the coding of the present pixel block is not completed, the routine advances to step 408.

Referring FIG. 12 and FIG. 13 next, the steps to be processed by the units (41, 42, 43, 44) of FIG. 5 are segmented as shown by the line boxes 41, 42, 44, and 44.

At step 501, as shown in FIG. 6(a), the processing start position in the sub-block SB is determined, and the processing start position is set at the predetermined start position.

At step 502, the context information Ict of the present sub-block is confirmed. According to this context information, the judgments at step 503 and step 504, and the processing of step 505 are carried out.

At step 506, when any of the conditions of steps 503, 504, and 505 described above is not met (NO), as shown in FIG. 6(b), degrees of priority are allocated to each sub-blocks according to the settlement regarding both of the prediction direction and priority degree allocation shown in FIG. 8.

At step 508, it is judged if there is a region to which the degree of priority has been allocated. When there is a region to which the degree of priority has been allocated, the routine advances to step 509 (FIG. 6(c)). If there is no region to which the degree of priority has been allocated, the routine advances to step 510 explained later.

At step 509, as shown in FIG. 7(g), when there is a region to which the priority degree has been allocated, the routine advances to a not yet decoded region having a high degree of priority, while at step 510, when there is no region to which the degree of priority has been allocated, the sub-block for which the decoding is to be carried out next is determined, and the processing is shifted to the not yet decoded sub-block (FIG. 7(h)).

Note that, at step 503, it is judged if there is a region in the peripheries which can be referred to for inter-picture prediction. When there is no region which can be referred to, the routine advances to step 507 so as to immediately decode the present sub-block. At this step 503, the context information Ict is referred to. If the present sub-block uses inter-picture prediction, the routine shifts to step 507 in order to immediately decode the present sub-block.

At step 504, if none of the sub-blocks at the peripheries referred to by the present decoded sub-block is a region which can be referred to (FIG. 7(e)), the routine advances to step 507 in order to immediately decode the present sub-block, and at step 507, the decoding of the present sub-block is instructed to the units (24, 25, and 26).

At step 511, following the results of step 507, if the decoding of all sub-blocks belonging to the present pixel block is completed, the decoding of the present pixel block is completed.

Note that the image processing methods explained above can also be expressed as image processing programs. Namely, these are:

(1) an image coding processing program for making a computer execute a routine of reading a prediction direction from context information and a routine of coding processing while adaptively changing a coding order of a plurality of sub-blocks to be sequentially encoded based on that read prediction direction and (2) an image decoding processing program for making a computer execute a routine of reading a prediction direction from context information and a routine of decoding processing while adaptively changing a decoding order of a plurality of sub-blocks to be sequentially decoded based on that read prediction direction.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing method where each of the pixel blocks composing a picture is divided into a plurality of sub-blocks and these plurality of sub-blocks are coded in sequence while referring to context information indicating at least a prediction direction in the picture or between the picture and an adjacent picture, comprising:
    reading the prediction direction from the context information; and
    coding each of said sub-blocks while adaptively changing a coding order of remaining sub-blocks that have not been coded based on the prediction direction.

2. An image processing method as set forth in claim 1, further comprising: after the above reading step,
    a head setting step of setting a head sub-block for starting the coding in the pixel block; and
    a priority degree allocating step of allocating respective priorities to peripheral reference sub-blocks which are adjoined to the head sub-block and referred to by the head sub-block according to the prediction indicated by the context information, in which a highest degree of priority is allocated to a first reference sub-block that has not been encoded but must be coded first, wherein the sub blocks being coded first are allocated the highest degree of priority.

3. An image processing method as set forth in claim 2, wherein when a not yet encoded sub-block still remains in the pixel block even after completion of the coding of the reference sub-block to which the lowest degree of priority was allocated, the above-mentioned head setting step, priority degree allocating step, and coding step are repeated.

4. An image processing method as set forth in claim 2, further transmitting designation information designating the head sub-block in the aforesaid head setting step to the decoder side, included in the context information or as additional information.

5. An image processing method as set forth in claim 2, wherein said priority degree allocating step is executed only when the reference sub-block is a not yet encoded sub-block and, when the coding of the reference sub-block has been already completed, this reference sub-block is referred to and the coding step is instantaneously executed.

6. An image processing method as set forth in claim 2, wherein said priority degree allocating step is executed only when the reference sub-block is a not yet encoded sub-block and, when all adjacent sub-blocks of the present sub-block to be coded are end sub-blocks of the picture or not yet encoded sub-blocks having lower degrees of priority, the present sub-block to be coded is instantaneously encoded.

7. An image processing method as set forth in claim 2, wherein when executing the above coding step, if a sub-block having a low degree of priority is going to refer to a sub-block having a higher degree of priority than that, the reference is prohibited.

8. An image processing method where each of the pixel blocks composing a picture is divided into a plurality of sub-blocks and these plurality of sub-blocks in sequence are decoded while referring to context information indicating at least a prediction direction in the picture or between the picture and an adjacent picture, comprising
   reading the prediction direction from the context information; and
   decoding each of said sub-blocks while adaptively changing a decoding order of remaining sub-blocks that have not been decoded based on the prediction direction read.

9. An image processing method as set forth in claim 8, further comprising: after the above reading step,
   a head setting step of setting a head sub-block for starting the decoding in the pixel block, and
   a priority degree allocating step of allocating respective priorities to peripheral reference sub-blocks which are adjoined to the head sub-block and are referred to by the head sub-block according to the prediction indicated by the context information, in which a highest degree of priority is allocated to a first reference sub-block that has not been decoded but must be decoded first, and
   decoding the first reference sub-block first to which the highest degree of priority is allocated.

10. An image processing method as set forth in claim 9, wherein when a not yet decoded sub-block still remains in the pixel block even after completion of the decoding of the reference sub-block to which the lowest degree of priority was allocated, the above-mentioned head setting step, priority degree allocating step, and decoding step are repeated.

11. An image processing method as set forth in claim 9, further receiving designation information designating the head sub-block in the aforesaid head setting step from the encoder side, included in the context information or as additional information of the context information.

12. An image processing method as set forth in claim 9, wherein the aforesaid priority degree allocating step is executed only when the reference sub-block is a not yet decoded sub-block and, when the decoding of the reference sub-block has been already completed, this reference sub-block is referred and the decoding step is instantaneously executed.

13. An image processing method as set forth in claim 9, wherein the aforesaid priority degree allocating step is executed only when the reference sub-block is a not yet decoded sub-block and, when all adjacent sub-blocks of the present sub-block to be decoded are end sub-blocks of the picture or not yet decoded sub-blocks having lower degrees of priority, the present sub-block to be decoded is instantaneously decoded.

14. An image processing method as set forth in claim 9, wherein when executing the above decoding step, if a sub-block having a low degree of priority is going to refer to a sub-block having a higher degree of priority than that, the reference is prohibited.

15. A recording medium storing an image processing program readable by a computer for a system where each of the pixel blocks composing a picture is divided into a plurality of sub-blocks and the plurality of sub-blocks are coded in sequence while referring to context information indicating at least a prediction direction in the picture or between the picture and an adjacent picture, and making the computer execute:
   a routine of reading said prediction direction from said context information; and
   a routine of coding each of said sub-blocks while adaptively changing a coding order of remaining sub-blocks that have not been coded based on the prediction direction.

16. A recording medium storing an image processing program readable by a computer for a system where each of the pixel blocks composing a picture is divided into a plurality of sub-blocks and the plurality of sub-blocks are decoded in sequence while referring to context information indicating at least a prediction direction in the picture or between the picture and an adjacent picture, and making the computer execute:
   a routine of reading said prediction direction from said context information; and
   a routine of decoding each of said sub-blocks while adaptively changing a decoding order of remaining sub-blocks that have not been decoded based on the prediction direction.

* * * * *